United States Patent [19]

Walters et al.

[11] Patent Number: 4,582,120

[45] Date of Patent: Apr. 15, 1986

[54] APPARATUS FOR COOLING FLUID SOLID PARTICLES IN A REGENERATION SYSTEM

[75] Inventors: Paul W. Walters, Ashland; H. Anthony Raiche, Russell; Lloyd E. Busch, Ashland, all of Ky.

[73] Assignee: Ashland Oil, Inc., Ashland, Ky.

[21] Appl. No.: 688,469

[22] Filed: Jan. 3, 1985

[51] Int. Cl.[4] ............................................... F28C 3/16
[52] U.S. Cl. .............................. 165/104.16; 34/57 A; 422/143; 422/146
[58] Field of Search ........................ 165/104.16, 142; 34/57 A; 422/143, 146

[56] References Cited

U.S. PATENT DOCUMENTS

| | | | |
|---|---|---|---|
| 2,527,846 | 10/1950 | Phinney et al. | 422/146 |
| 3,679,373 | 7/1972 | Vancamp et al. | 422/146 |
| 4,176,710 | 12/1979 | Gansauge et al. | 165/104.16 |
| 4,203,804 | 5/1980 | Janning et al. | 34/57 A |
| 4,378,744 | 4/1983 | DeFeo et al. | 165/104.16 |
| 4,392,943 | 7/1983 | Euzen et al. | 422/143 |

Primary Examiner—Albert W. Davis, Jr.
Attorney, Agent, or Firm—Richard C. Willson, Jr.; James L. Wilson

[57] ABSTRACT

The present invention is concerned with the cooling of the fluidizable particulate solids, either catalytic or inert, in the regenerator section of an FCC process, an RCC process or a metals removal systems or "ART" type process. It is directed to the use of a conduit means for charging fluidizing gaseous material to a vertical cylindrical vessel for cooling fluidizable particulate solids flowing through said vertical cylindrical vessel, which conduits means comprises a horizontal header means having suspended therefrom a plurality of vertical and horizontally spaced apart conduits, each conduit having near its open end a restriction orifice. The header means can be located near the top of the cylindrical cooling vessel. While the example of a specific embodiment discloses one portion of the vertical conduits with lower ends located in a lower cross-sectional area of the vessel other arrangements sufficient to ensure proper fluidization are also possible.

25 Claims, 4 Drawing Figures

APPARATUS FOR COOLING FLUID SOLID PARTICLES IN A REGENERATION SYSTEM

BACKGROUND OF THE INVENTION

Useful petroleum products, such as gaseous and liquid fuels, are derived from crude oil by means of one or more petroleum refining techniques. Crude oil is made up of a diverse mixture of hydrocarbons and other compounds which can vary widely in molecular weight and can boil over a rather wide range. Some crude oils contain as much as up to 60 volume percent or more of compounds that boil at temperatures above about 343° C. (650° F.). Such high-boiling components of crude oil are unsuitable as consituents of gasoline or other liquid hydrocarbon fuels. One of the petroleum refining techniques for handling such high molecular weight, high boiling compounds is the fluid catalytic cracking (FCC) process, which cracks or breaks down the high-molecular weight molecules into smaller molecules which boil over a more appropriate boiling range. Today, after many refinements, the FCC process has reached a highly advanced state and many modified forms and variations have been developed. This has culminated in the cracking of a restricted boiling range hydrocarbon feedstock in a riser reaction zone under cracking conditions and at an elevated temperature in contact with a fluidized cracking catalyst that is suspended in the feedstock being cracked, such cracking conditions providing at the riser outlet a temperature in the range of about 510° C. (950° F.) to about 593° C. (1100° F.).

Raw crude oils and certain fractions thereof contain a variety of components which will deposit troublesome deactivating materials on a catalyst, when such components contact the catalyst. This occurs when such oils and/or fractions are catalytically cracked. It is essential that as much as possible of these deactivating materials be removed from the feed prior to its being cracked. However, only a portion of such troublesome deactivating materials can be removed economically from either the crude oil and its fractions or the catalyst, in this case, the fluidized cracking catalyst. Listed among such troublesome deactivating materials are coke precursors, such as asphaltenes, polynuclear aromatics, and the like; heavy metals, such as nickel, vanadium, iron, and copper; lighter metals, such as sodium and potassium; sulfur; and nitrogen. Desalting operations, which are used normally to pretreat crude oil or its fractions that will be used as feed for the FCC process, can remove essentially all of the lighter metals.

On the other hand, coke precursors, such as asphaltenes and polynuclear aromatics, tend to break down and form hydrocarbonaceous deposits or coke on the catalyst during the cracking operation. Such deposits impair further contact of the hydrocarbon feedstock with the active catalytic sites of the catalyst and, hence, reduce conversion. Moreover, any heavy metals in the feed being treated transfer almost quantitatively from the feedstock to the surface of the catalyst, blocking active sites and unfavorably altering the nature of its catalytic effect upon the feedstock. For example, vanadium tends to form fluxes with certain components of commonly used FCC catalysts, lowering the melting point of portions of the catalyst particles. The catalyst is poisoned by accumulations of vanadium and other heavy metals, particularly nickel. Such metals tend in varying degrees to promote hydrogenation, dehydrogenation, and aromatic condensation, resulting in excessive production of carbon and gases with consequent impairment of the yields of liquid fuel components.

In recent years, as the petroleum industry began to suffer from a lack of crude availability as to quantity and quality accompanied by increasing demand for gasolines having increased octane values, the supply situation changed from a surplus of light, sweet crudes to a tighter supply having an increasing amount of heavier crudes containing higher amounts of sulfur and nitrogen. Many of such heavier crudes also contained much higher concentrations of metals and coke precursors or carbon formes, along with increased amounts of asphaltic components.

The need to process heavier and less desirable crudes caused the petroleum industry to search for and provide processing schemes which could utilize such heavier crudes in producing gasoline and other liquid fuel products. The literature has described many of these processign schemes. For example, various proposals in the prior art involve the treating of a heavy oil feed to remove the metals therefrom prior to subjecting the feeds to cracking. Such treating involves hydrotreating, solvent extraction, and complexing with Friedel-Crafts catalysts, but such techniques nullify the refining costs and are criticized as being unjustified economically in the present environment for crude oil availability. Another proposal involves a combination cracking process comprising separate "dirty oil" and "clean oil" processing units. In yet another proposal, residual oil is blended with gas oil and the quantity of residual oil in the mixture is controlled relative to the equilibrium flash vaporization temperature at the bottom of the riser-type cracking reaction zone that is employed in the process. In still another proposal, the feed is subjected to a mild preliminary hydrocracking or hydrotreating operation before it is introduced into the cracking unit.

Although much time, effort, and money have been expended and although some of the above proposals do overcome one or more of the difficulties involved in the conversion of such heavy oil and residual oil fractions, there is a scarcity of techniques for handling such heavy oil fractions, which techniques are both economical and highly practical in terms of technical feasibility. Many hydrocarbon oils, such as crude oils or crude fractions or, in fact, other heavy oil fractions that contain a relatively large amount of nickel and/or other heavy metals exhibit deleterious behavior as described. Such oils not only contain the heavy metals but also relatively large amounts of coke precursors or carbon formers. These heavy oil feedstocks are referred to herein as carbo-metallic oil feeds and represent a particular challenge to the petroleum refiner in his attempt to achieve economic conversion thereof to more useful fuel products comprising gasoline, light cycle oil products and heavy crude oil products. In some cases, various crude oils are relatively free of such high-boiling carbon precursors and coke formers, or heavy metals, or both.

Generally, the troublesome components of crude oil are, for the most part, concentrated in the highest boiling fractions of the crude oil. In view of this, the problems of Conradson carbon coke precursors and the accumulation of heavy metals have been avoided largely by sacrificing some liquid fuel yield that would be potentially available from the highest boiling vacuum bottom portions of crude oils. Since those fractions of crude oil which boil at a temperature within the range of about 343° C. (650° F.) to about 538° C. (1100°

F.) is relatively free of heavy metal and Conradson carbon comtamination, such fraction is made a part of the gas oil feedstock to conventional FCC units. Vacuum bottoms material is not included in such feedstock. In general, feedstock comprising atmospheric gas oil and vacuum gas oil (VGO) is generally prepared from crude oil in a two-step technique. The atmospheric gas oil fraction is removed by distillation or the middle distillate boiling below about 316° C. (600° F.) or about 343° C. (650° F.) at atmospheric pressure is distilled from the crude oil. Then vacuum gas oil boiling from about 316° C. (600° F.) up to about 538° C. (1,000° F.) or 552° C. (1,025° F.) end boiling point is separated by vacuum distillation. Gas oil boiling above 316° C. (600° F.) obtained from atmospheric distillation and/or gas oils obtained by vacuum distillation are used as the feedstock for the conventional gas oil FCC processing.

The heavier vacuum resid or vacuum bottoms product obtained from crude oil distillation is normally employed in a number of other ways, for example, such as for the production of asphalt, residual fuel oil, number 6 fuel oil, or marine Bunker C fuel oil. Today it is believed that such vacuum resid represents a great waste of the potential value of this bottom portion of the crude oil, particularly in light of the great effort and expense which the art has been willing to expend in an attempt to provide the relatively similar materials from other sources, such as shale oils and coal.

Generally, the coke-forming tendency of a hydrocarbon oil can be ascertained conveniently by determining the amount of carbon (wt. %) remaining after a sample of that hydrocarbon oil has been pyrolized. Such carbon value is accepted by the industry as a measure of the extent to which a given oil tends to form non-catalytic coke, when such oil is employed as a feedstock in a catalytic cracker. The Conradson Carbon ASTM Method D189 and the Ramsbottom Carbon ASTM Test No. D524-76 are accepted tests for measuring the coke producing tendencies of oils. In the conventional gas oil FCC operation, Conradson carbon values that are generally less than 2 and Ramsbottom carbon values of about 0.1 to 1.0 indicate an acceptable gas oil feed.

As the trend for refining the heavier fractions of crude oils and crude oils transpires, more processes will be developed to treat such higher boiling feedstocks. Among these is the process described in U.S. Ser. No. 413,870 by Miller et al. In such a process, a crude oil is separated into its various fractions by atmospheric distillation and the resid fraction from that distillation step is subsequently distilled in a vacuum distillation tower. The vacuum gas oil produced in such a process is then hydrogenated and can be conveniently combined with a portion of the vacuum resid fraction and optionally with atmospheric gas oil and the resulting mixture employed as a feedstock in a riser-type reaction FCC unit. Moreover, a processing technique is described by Walters et al, in U.S. Ser. No. 617,764 for the combustion removal of high levels of carbonaceous material deposits. Such processes are employed to treat hydrocarbon feedstocks which have Conradson Carbon values in the range of 2 to about 12 and Ramsbottom Carbon values above about 1.0. Such feeds provide a substantially greater potential for coke formation than that which is more usually obtained with feedstocks for gas oil FCC units, which feedstocks have Conradson Carbon values of less than 2.

The more conventional prior art FCC practice involves feedstocks for FCC processing that have heavy metal contents limited to a relatively low value, e.g., about 0.25 ppm Nickel Equivalents (nickel plus vanadium) or less. Those feedstocks which provide the Conradson Carbon values in the range of 2 to 12 in general contain a metal contamination concentration that is in excess of the 0.25 ppm Nickel Equivalents value. Therefore such a feedstock has significantly greater potential for providing a more rapidly accumulating on and poisoning of the catalyst being employed beyond the economic recovery thereof.

In the prior art conventional FCC practice, the metal content of the catalyst is maintained at a level which may, for example, be in the range of about 200 ppm to about 600 ppm Nickel Equivalents. However, the processes employing the heavier feedstocks are concerned with the use of catalysts that have accumulated a rather substantial amount of metals and which, therefore, have a much greater than normal tendency to promote undesired reactions of dehydrogenation, aromatic condensation, gas production, or coke formation. Normally, a metals accumulation of 1,000 ppm to about 3,000 ppm is regarded as quite undesirable in FCC processing.

It is well known that the higher the molecular weight is in a hydrocarbon feedstock, the higher will be the Conradson Carbon value of the feed and, consequently, the higher will be the deposition of hydrocarbonaceous material on the fluidized solid particles. Those feeds comprising components that boil above a temperature of about 552° C. (1,025° F. ) or 566° C. (1,050° F.) and comprising the vacuum resid fraction of a hydrocarbon feedstock will increase the deposition of the carbonaceous material on the fluidized solid particles during the conversion of residual oil. Such deposition of carbonaceous material comprising hydrogen deactivates the catalyst particles. Such carbonaceous material is referred ro simply as coke. In the typical FCC process, the deposited hydrocarbonaceous material is removed from the catalyst by combustion in a separate regeneration vessel provided for that purpose.

It is well known that an increase in the level of coke deposition on fluidized catalyst particles will increase the combustion temperature that is encountered, unless appropriate precautions are taken. Such increase in combustion temperature can be controlled by reducing the catalyst circulation rate, by reducing the concentration of oxygen in the combustion supporting gas, by using higher temperature particles, by providing indirect heat exchange means within the bed of solids in the combustion zone, and combinations thereof. The patents of Medlin, et al., U.S. Pat. No. 2,819,951; McKinney, U.S. Pat. No. 3,990,992; and Vickers, U.S. Pat. No. 4,219,442, disclose fluid catalytic cracking processes using dual combustion zone regenerators with cooling coils in particularly the second regeneration zone. The use of catalyst coolers, which are external to the regeneration or coke combustion zone, is also known in the prior art. For example, please see Harper, U.S. Pat. No. 2,970,117; Owens, U.S. Pat. No. 2,873,175; McKinney, U.S. Pat. No. 2,862,798; Watson, et al., U.S. Pat No. 2,596,748; Jahnig, et al., U.S. Pat. No. 2,515,156; and Berger, U.S. Pat. No. 2,492,948. In addition, Walters, et al., in U.S. Ser. No. 617,764 depart from the prior art by providing catalyst regeneration systems that are considered more suitable for the combustion removal of high levels of carbonaceous material deposits of residual oil conversion from fluid particles and/or catalyst particles in temperature-controlled environments contributed in part by the special design of the regeneration system that is employed in combination with an external catalyst or fluid particulate sorbent cooler. Such cooler design can be used in conjunction with one or more stages of catalyst regeneration. In this cooler design, a plurality of horizontal and vertically-spaced apart gas distributor means into one or more chambers in the regeneration system provides for passing fluidizing gas into the chambers in order to contact said fluidizing gas with solid particles flowing downwardly through said chamber. However, certain disadvantages are associated with this plurality of horizontal and vertically-spaced apart gas distributor means, which comprises a plurality of horizontal and vertically-spaced apart conduit means. The high temperature in the cooler vessel, as high as 760° C. (1,400° F.), and the downward pressure of the fluidizable particulate solids passing downwardly around the horizontal conduit means results in deformation of the conduit means. Deformation of the conduit means leads to impingement of the fluidizing gas emanating from the apertures of the conduit means upon adjacent cooler tubes, causing localized erosion of the cooler tubes.

The present invention is directed to an improved apparatus for cooling fluidized solid particles. The improvement comprises the use of vertical aeration lances, conduits, or tubes. Such vertical aeration lances, conduits, or tubes aviod, or at least minimize, high temperature deformation of such lances, conduits, or tubes and, hence, prevent the resulting localized erosion of cooler tubes.

SUMMARY OF THE INVENTION

The present invention is concerned with the cooling of the fluidizable particulate solids, either catalytic or inert, in the regenerator section of an FCC process, an RCC process or a metals removal system or "ART" type process. It is directed to the use of a conduit means for charging fluidizing gaseous material to a vertical cylindrical vessel for cooling fluidizable particulate solids flowing through said vertical cylindrical vessel, which conduit means comprises a horizontal header means having suspended therefrom a plurality of vertical and horizontally spaced apart conduits, each conduit having near its open end a restriction orifice. The header means can be located near the top of the cylindrical cooling vessel. While the example of a specific embodiment discloses one portion of the vertical conduits with lower ends located in an intermediate cross-sectional area of the vessel and a second portion of the vertical conduits with lower ends located in a lower cross-sectional area of the vessel other arrangements sufficient to ensure proper fluidization are also possible. The orifice is designed to provide a drop in pressure of about 1 psi to about 10 psi, and preferably about 4 psi to about 6 psi.

BRIEF DESCRIPTION OF THE DRAWINGS

This patent specification refers to and is accompanied by four figures.

FIGS. 1, 3 and 4 are simplified diagrams, and therefore, do not show various pieces of auxiliary equipment, such as pumps, valves, cyclones, and other equipment needed to separate solid particulate material from gases and vapors, since the location and use of such auxiliary equipment would be known by those having ordinary skill in the art.

DETAILED DESCRIPTION AND PREFERRED EMBODIMENT

Figure 1:
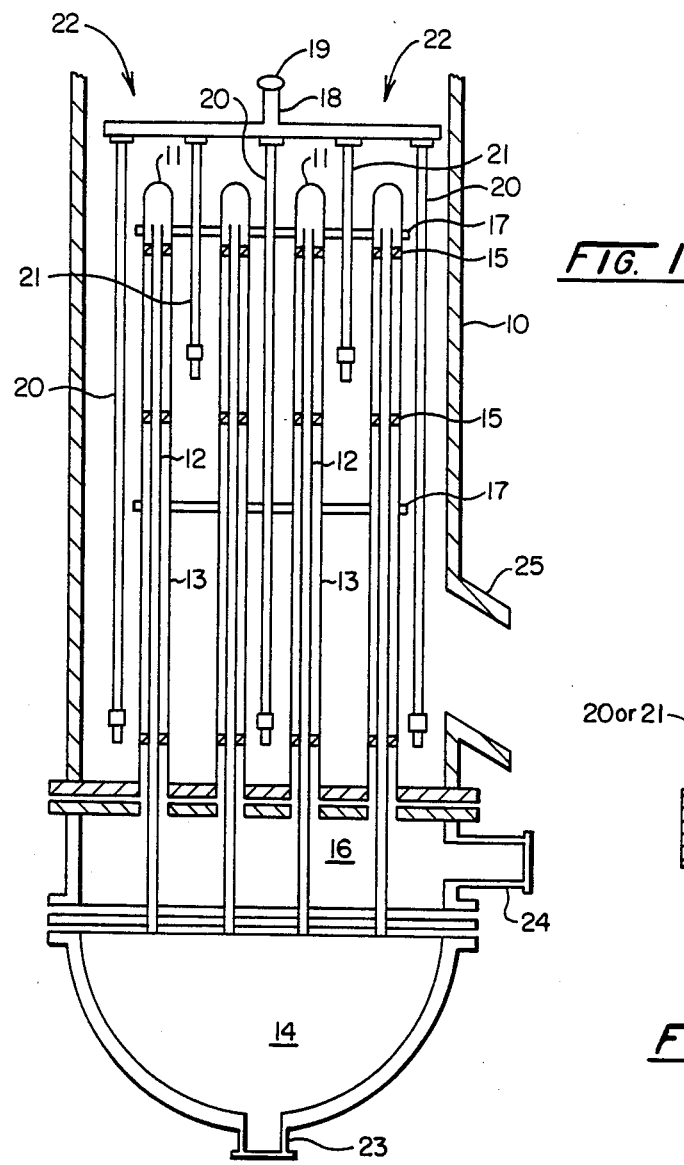
FIG. 1 provides a simplified schematic diagram in elevation of an embodiment of the improved cooling vessel of the present invention.

In U.S. Ser. No. 617,764, Walters, et al., provide a method for regeneration of solid catalyst particulate material, a method for cooling hot solid particulate material, and an arrangement of apparatus for cooling the hot solid particulate material. The method for regeneration involves regeneration of the solid particles by combustion of deposited hydrocarbonaceous material in two separate stages arranged in sequential flow of catalyst therethrough. The regeneration of the solid catalyst particles is accomplished in the first stage of regeneration under conditions providing a CO-rich flue gas recoverable therefrom at an elevated temperature of up to about 760° C. (1,400° F.). A $CO_2$-rich flue gas comprising combustion-supporting amount of oxygen is recovered from the second and lower stage of catalyst regeneration and is passed upwardly through the catalyst bed into the first and upper stage. An external heat exchange zone, i.e. a heat exchange zone that is external to the regeneration zones, comprises a cylindrical chamber open in the upper cross-sectional area thereof for charging heated fluidizable solid particles thereto. Extending upwardly from the bottom portion of this vertical cylindrical vessel is a plurality of bayonet-type heat exchange tubes, each of said heat exchange tubes comprising two coaxially-aligned conduit means providing an annular passageway between the inner and outer conduit means, connected to appropriate header means in the bottom of the vertical cylindrical vessel. Accordingly, a plurality of substantially vertical elongated open-ended first conduit means of selected spaced apart arrangement provided throughout the cross section of the cylindrical vessel extend from a bottom header section upwardly through a separate upper header section adjacent thereabove and into an upper portion of the cylindrical vessel. A second elongated coaxially-aligned conduit means of larger diameter than the first conduit means and closed at an upped end thereof provides a separate annular passageway with the first conduit means. The annular passageway of each of said first and second conduit means is in open communication at the bottom thereof with the upper horizontal header section provided in a lower portion of the vertical cylindrical vessel. The upwardly-extending plurality of elongated conduit combinations comprising said first and second conduit means are spaced from one another horizontally a selected distance that is sufficient to provide space for a downward relatively dense flow of fluidized solid particles. A heat exchange fluid passes first upwardly through the first conduit means in the vertical conduit means combination and then downwardly through the annular passageway formed by the vertical conduit means combination. The downwardly flowing solid particles are indirectly cooled by heat exchange with the heat exchange fluid passing through the plurality of elongated conduit combinations. In order to assist the fluid-like downflow of fluid solid particles through the cylindrical heat exchange vessel and about the plurality of vertical conduit combinations, a low-velocity fluidizing or fluffing gas is charged to a lower cross-sectional portion and to an intermediate cross-sectional portion of the vertical cylindrical vessel by means of a plurality of vertically spaced apart elongated gas distributing means. Specifically, the plurality of vertically spaced apart fluidizing elongated gas distributing means can be inverted "V"-shaped channels or tubular means provided with openings in a bottom portion thereof for discharging the relatively low velocity fluidizing or catalyst fluffing gas.

The method for regeneration of solid particulate material, the method for cooling hot solid particulate material and the heat exchange apparatus of U.S. Ser. No. 617,764 are suitable for application with a metals removal system wherein a heavy residual oil feed comprising components boiling above 552° C. (1,025° F.) and including porphyrins, asphaltenes, and metal contaminants is partially decarbonized and demetallized alone and in combination with a decarbonized-demetallized reduced crude fluid catalyst cracking system (RCC).

The subject matter of U.S. Ser. No. 617,764 is incorporated herein by reference and made a part hereof.

The improved fluid catalyst or fluidizable particulate solids cooler of the present invention is an apparatus comprising a large vertically elongated cylindrical vessel that is open in the upper end thereof or has an inlet at its upper end and is in direct communication with a fluid bed of solid particles which are either catalytic or inert. The bottom portion of this large cylindrical vessel is provided with two separate vertically spaced apart but adjacent header sections or zones which extend across the cross section of said large cylindrical vessel. A plurality of substantially vertical elongated open-ended first conduit means of selected spaced apart arrangement provided throughout the cross section of the cylindrical vessel extend from a lower header section upwardly through a separate upper header section adjacent to and above said lower header section and into the cylindrical vessel. A coaxially-aligned elongated second conduit means of larger diameter than said first conduit means and closed at an upper end thereof and encasing said first conduit means provides an annular passageway with said first conduit means. Hence, there is a plurality of annular passageways, each comprising the arrangement of a first conduit means and a second conduit means. These annular passageways are in open communications at the bottom thereof with the upper horizontal header section provided in the lower portion of the large elongated conduit combinations, each comprising said first conduit means and said second conduit means, are spaced from one another horizontally a selected distance sufficient to provide space for a downward relatively dense flow having fluidized solid particles of an average particle size within the range of about 20 microns to about 150 microns. The downwardly flowing solid particles are indirectly cooled by heat exchange with a heat exchange fluid passing first upwardly and then downwardly through said upwardly extending plurality of elongated conduit combinations. Partially cooled fluid particulate solids are withdrawn from said cylindrical vessel through a side outlet located near the bottom of said cylindrical vessel above said upper header chamber.

The fluidizable solid particles enter the elongated cylindrical vessel near or at its top and pass downwardly through said cylindrical vessel and about the vertical heat exchange conduit combinations. In order to assist with fluid-like downflow of the fluidizable solid particles through the cylindrical heat exchange vessel, a low-velocity fluidizing or fluffing gas is charged to a lower cross sectional portion of the cylindrical vessel and to an intermediatee cross sectional portion of said cylindrical vessel by a means for charging fluidizable gaseous material to said lower cross sectional area and said intermediate cross sectional area. Said means for charging fluidizing gaseous material comprises a horizontal header means located near the top of said cylindrical vessel and having suspended therefrom a plurality of vertical aeration conduits, a first portion of said vertical aeration conduits being of sufficient length to have their lower ends located in said lower cross sectional area of said cylindrical vessel and a second portion of said vertical aeration conduits being of sufficient length to have their lower ends located in said intermediate cross sectional area of said cylindrical vessel. Each of the vertical aeration conduits, whether a member of said first portion or a member of said second portion, is equipped with a restriction orifice which is located in that vertical aeration conduit a distance of about eight times the inside diameter of the vertical aeration conduit from the bottom of the vertical aeration conduit. The restriction orifice is designed to provide a 4 psi to 5 psi drop in pressure. Of course, there is negligible pressure drop in the conduit. The velocity of the fluidizing gas exiting from the conduit or lance is typically within the range of about 175 ft./sec. to about 200 ft./sec. A maximum exiting velocity of the fluidizing gas is 250 ft./sec.

According to the present invention, cylindrical aeration tubes or lances are employed in a sorbent cooler or a catalytic cooler in a vertical manner. In this way, each of the areation tubes or lances is suspended from a header near the top of the cooler vessel in a downward direction, each tube or lance being parallel to the vertical axis of the cooler vessel. A restriction orifice is located in each of the cylindrical tubes or lances near the bottom end of the tube or lance. Air or other fluidizing gas is introduced through the header into and down through each tube or lance and through the restriction orifice in that tube or lance and exits from the tube or lance at its lower end. The air or other fluidizing gas then passes up through the descending sorbent or catalyst particles in the cooler vessel, facilitating flow of the sorbent or catalyst particles down through the cooler vessel for uniform contact of the sorbent or catalyst particles with the heat exchange surfaces.

The accompanying FIG. 1 depicts an embodiment of the improved apparatus of the present invention, wherein vertical aeration tubes or lances are employed in the cooling vessel. It is to be understood that while this embodiment is directed to a fluidizable particulate sorbent and to the cooling of that sorbent, it could just as easily be directed to the cooling of a fluid catalyst, such as a fluid cracking catalyst. Moreover, the cooling vessel can be of different sizes with respect to its length and diameter and can obtain a variable number of the aeration lances or tubes and the heat exchanger tubes, the size of each of which can be variable. Sizes and numbers would be governed by the amount and type of sorbent being cooled, the flow rates of sorbent and cooling medium, the temperature differential desired, and the like.

Referring to FIG. 1, there is represented diagrammatically a vertical, cylindrical sorbent cooling vessel, 5 through which fluidizable particulate solids pass. The vessel comprises a shell 10 that is provided with a plurality of upwardly extending bayonet type heat exchange tubes 11, each comprising an inner tube 12 coaxially positioned within an outer tube 13. The open ended inner tube 12 is in open communication at the top with the outer larger-diameter tube 13, which is closed at its top. The inner tubes 12 are connected at their bottoms with a header chamber 14. The inner tubes 12 are provided with a plurality of vertically spaced apart fin tube guide 15. The outer tubes 13 communicate in a bottom annular open end with a separate header chamber 16 positioned above header chamber 14. The outer tubes 13 are provided with spacing support means 17. Near the top of the sorbent cooling vessel is located a fluidizing gas horizontal distributor means 18 having connected thereto fluidizing gas inlet 19 and having suspended therefrom a plurality of vertical aeration lances or tubes 20 and 21. The aforesaid lances 20 are the longer lances and the aforesaid lances 21 are shorter lances, thus providing two levels for introducing fluidizing gas into the sorbent cooling vessel. Although only two aeration levels are shown, more levels are possible and even preferable if the length of cylindrical sorbent cooling vessel were longer.

The particulate solid sorbent is introduced into the sorbent cooling vessel near its top and the sorbent particles are allowed to pass downwardly through the cooling vessel as shown by arrows 22, passing the downwardly extending aeration lances 20 and 21 and the upwardly extending heat exchange tubes 11. The solid particulate material can have an average particle size within the range of about 20 microns to about 150 microns.

The grid means used to space apart the vertical tubes extending upwardly from the bottom of the cylindrical cooling vessel provides a loose spacing with such vertical conduits or tubes. Any means suitable for the purpose and permitting free flow of the solid particulate material downwardly through the cooling vessel can be used.

The number of vertical aeration lances or tubes for discharging the relatively low-velocity fluidizing or solid particulate material fluffing gas should be such as to provide a row of said aeration lances or tubes between at least every second row of the plurality of the spaced apart heat exchange conduit combinations 11.

While it is not intended to limit the scope of the present invention, the following example of heat exchanger design is being provided for illustrative purposes only. The metal employed to fabricate the parts should be able to withstand the elevated temperatures and maintain structural integrity. As an example, the heat exchanger can be designed for a pressure of 600 psi at a temperature of 260° C. (500° F.). The heat exchanger tubular arrangement comprises 1⅜ inch O.D. tubes of 3/16 inch wall thickness for the inner tubes 12 in combination with outer tubes 13 having an I.D. that will provide an annular passageway which is at least ½ inch wide. These bayonet type elongated tube combinations are spaced substantially horizontally in a square grid system of about 4.5 to 5 inches between their central vertical axes, thereby providing about 2 inches between tubes.

The heat exchange fluid, e.g., boiler feed water, is introduced into the lower header 14 of the cooling vessel via inlet 23, flows up through open-ended tubes 12 and down through the annular space between inner tubes 12 and outer tubes 13 into upper header 16. The heat exchange fluid then passes out of the cooling vessel via outlet 24.

The hot solid fluid particulate material is partially cooled by indirect heat exchange with the heat exchange fluid as it falls down through the cooling vessel and around the heat exchange tube combinations 11. The partially-cooled solid particulate material passes out of the cooling vessel by way of side outlet 25. The aeration gas or fluffing gas passes down through each vertical aeration conduit 20 and each vertical aeration conduit 21 and through the restriction orifice near the bottom of each conduit. A suitable pressure drop across the orifice is 4 psi to 5 psi. The restriction orifice is located a distance up the aeration conduit or tube that is equivalent to 8 conduit diameters from the bottom of the conduit. The fluidizing gas exits from the bottom of each aeration conduit or tube at a velocity within the range of about 175 ft./sec. to about 200 ft./sec. A maximum exiting velocity of 250 ft./sec. can be employed. The velocity of the fluidizing gas as it passes down through the aeration lance or tube prior to encountering the restriction orifice is about 3 to 4 times the value of the exiting velocity.

The two lengths of aeration lances or conduits are divided equally in the cooling vessel. The shorter lances 21 have their lower ends located at a level that is about 50% to about 70% of the distance from the top to the bottom of the cooling vessel while the longer lances 20 have their lower ends located at a level that is about 85% to about 95% of the distance from the top to the bottom of the cooling vessel.

Figure 2:
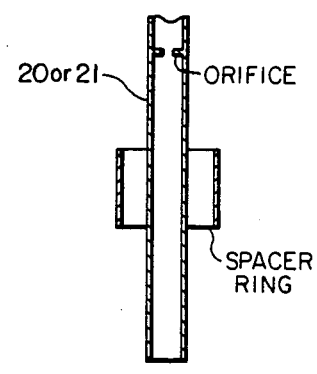
FIG. 2 presents a detailed diagram of the nozzle end of a vertical lance, conduit, or tube that is employed in the improved cooling vessel of the present invention.

FIG. 2 depicts a cross section of the nozzle end of aeration conduit 20 or aeration conduit 21. The orifice is located up the conduit at a distance that is 8 times the diameter of the conduit. Surrounding at least a portion of the aeration conduit is a spacer ring which can be a substantially concentric conduit of larger diameter than the aeration conduit. This spacer ring ensures that the effluent from the aeration conduit does not adversely impinge upon any of the elongated heat exchange conduit combinations.

As reported hereinabove, a disadvantage of the cooling vessel described in U.S. Ser. No. 617,764 is the fact that such horizontal aeration conduits or tubes will not withstand the high temperatures of up tp 760° C. (1,400° F.) in the cooling vessel and the downward pressure caused by flow of fluidizable solid particles, resulting in drooping and/or twisting of the horizontal conduits or tubes. This deformation of the horizontal aeration tubes leads to inpingement of the aeration gas on the vertical heat exchange tubes, leading to localized erosion of these heat exchange tubes. Such localized erosion results in the formation of holes in the heat exchange tubes.

The present invention eliminates this problem. The cooling vessel of the present invention provides a means for charging fluidizing gaseous material, which means comprises a header means which is located near the top of the cylindrical cooling vessel and which has suspended therefrom a plurality of vertical aeration conduits. Since these vertical aeration conduits are supported at their top, they can expand freely downward and will maintain a straight plumb attitude. They will not deform as a result of the elevated temperatures or the down-flowing fluidizable solid particles.

According to the present invention, there is provided and arrangement of apparatus for transferring heat between solid particulate material of fluidizable particle size and a heat exchange fluid, which arrangement of apparatus comprises in combination: (a) a substantially vertical cylindrical chamber having at its upper end an inlet for charging heated solid particulate material thereto; (b) a bottom portion of said cylindrical chamber, said bottom portion being separated into an upper header chamber and a lower header chamber; (c) a plurality of open-ended first conduits in substantially parallel arrangement extending upwardly from said lower header chamber to an upper part of said cylindrical chamber and being substantially parallel to the axis of said cylindrical chamber; (d) a plurality of second conduits having larger diameters than said open-ended first conduits, each of said second conduits being substantially parallel to and encasing one of said open-ended first conduits to form a conduit combination therewith and to provide an annular space between the two substantially concentric conduits of said conduit combination, the plurality of said open-ended first conduits and the plurality of said second conduits providing a plurality of conduit combinations, each of said second conduits being in open communication at the bottom annular end thereof with said upper header chamber; (e) a means for charging a heat exchange fluid to said lower header chamber and a means for withdrawing heated heat exchange fluid from said upper header chamber; (f) a means for charging fluidizing gaseous material to said cylindrical chamber, preferably at a lower cross-sectional portion and an intermediate cross-sectional portion of said cylindrical chamber. Said means for charging fluidizing gaseous material preferably comprises a header means located within said cylindrical chamber near the upper end of say cylindrical chamber and having suspended from said header means a plurality of vertical aeration conduits. A first portion of said vertical aeration conduits preferably has their lower ends located in said lower cross-sectional portion of said cylindrical chamber. Each of said vertical aeration conduits further has a restriction orifice in that vertical aeration conduit near the lower end of that vertical aeration conduit. There is an opening in the side of said cylindrical chamber above said upper header chamber for withdrawing solid particulate material that is passed downwardly through said cylindrical chamber in indirect heat exchange with said heat exchange fluid passing through the annular space provided by the plurality of conduit combinations.

Moreover, there is provided in an improved apparatus for transferring heat between solid particulate material of fluidizable particle size and a heat exchange fluid, which apparatus comprises in combination a vertical cylindrical vessel having an inlet at its upper end for charging heated solid particulate material to said cylindrical vessel, a bottom portion of said cylindrical vessel, said bottom portion being separated into upper and lower header chambers, a plurality of open-ended first conduits in parallel arrangement extending upwardly from said lower header chamber to an upper part of said cylindrical vessel, a plurality of second conduits having larger diameters then said open-ended first conduits, each of said second conduits having a diameter that is larger than the outside diameter of said first conduits and being concentric with and encasing one of said open-ended first conduits to form a conduit combination providing an annular space between the two concentric conduits of said conduit combination, each of said second conduits being in open communication at the bottom annular end thereof with said upper header chamber, a means for charging a heat exchange fluid to said lower header chamber and a means for withdrawing heated heat exchange fluid from said upper header chamber, a means for charging fluidizing gaseous material to a lower cross-sectional portion and an intermediate cross-sectional portion of said cylindrical vessel, and an opening means in the side of said cylindrical vessel above said upper header chamber for withdrawing cooled solid particulate material that has passed downwardly through said cylindrical vessel in indirect heat exchange with said heat exchange fluid passing through said annular space provided by the conduit combinations, the improvement which comprises said means for charging fluidizing gaseous material comprising a header means located within said cylindrical vessel and near the upper end of said cylindrical vessel and having suspended from said header means a plurality of vertical aeration conduits, a first portion of said vertical aeration conduits preferably having their lower ends located in said lower cross-sectional portion of said cylindrical vessel and a second portion of said vertical aeration conduits preferably having their lower ends located in an intermediate cross sectional portion of said cylindrical vessel, each of said vertical aeration conduits having a restriction orifice in that vertical aeration conduit near the lower end of that vertical aeration conduit. Other locations for aeration conduits at other heights are considered to be within the scope of this invention.

The following examples showing the use of the improved cooling apparatus of the present invention are not intended to limit the scope of the present invention and are presented for the purpose of illustration only. It should be pointed out that the number of aeration lances, conduits, or tubes that are used in a particular cooling or heat exchange vessel and how they are spaced from one another are controlled or governed by the dimensions of the apparatus, said number being sufficient to provide adequate and proper aeration of the solid fluidizable particulate material passing down through the cooling vessel.

The improved cooling vessel of the present invention is suitable for use in a system that can be used to demetallize and decarbonize, at least partially, a heavy residual oil feedstock comprising components boiling above 552° C. (1,025° F.) and including porphyrins, asphaltenes, and metal contaminants, i.e., a carbo-metallic oil. Such improved cooling vessel can be used also conveniently in a Reduced Crude Conversion (RCC) operation involving a fluid catalytic cracking riser reaction zone and catalyst regeneration system. Examples of each of these systems are presented and described by Walters, et al., in U.S. Ser. No. 617,764. The improved cooling vessel of the present invention would replace the cooling vessel proposed in U.S. Ser. No. 617,764.

Figure 3:
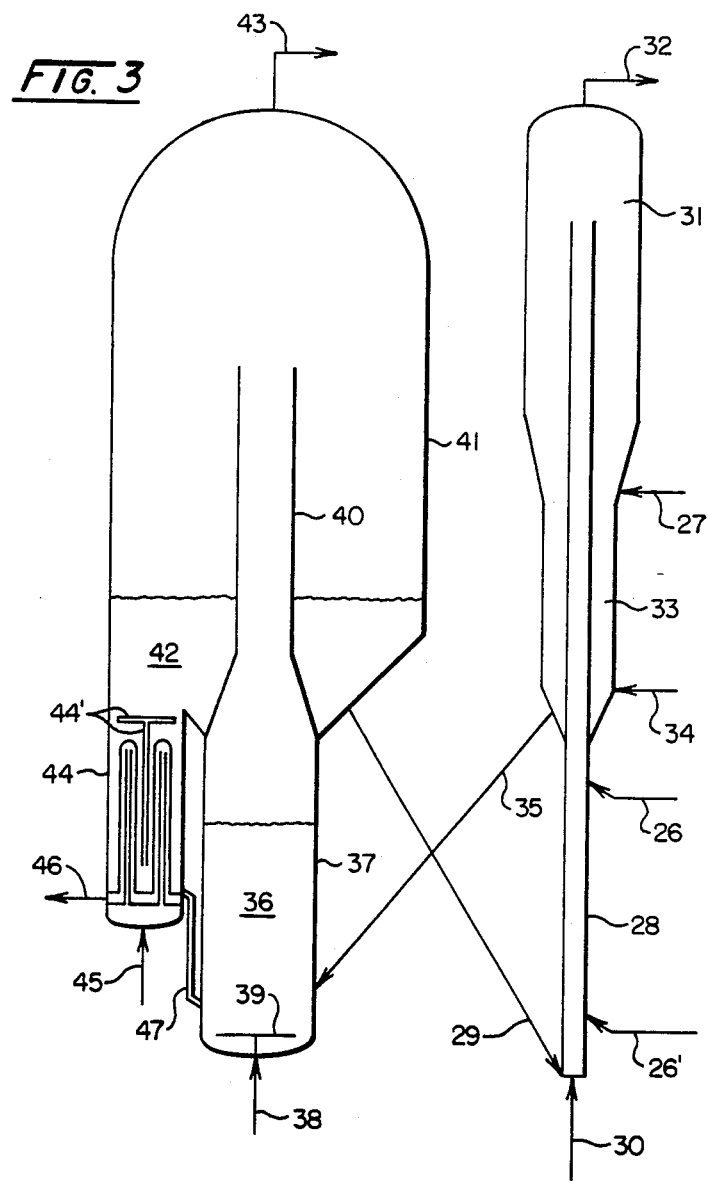
FIG. 3 is a simplified diagram of the apparatus employed for partial metals removal and decarbonization of a carbo-metallic oil with inert solid particulate material, said apparatus having as one of its components the improved cooling vessel of the present invention.

For example, a brief description of a system that is used to demetallize and decarbonize a heavy residual oil, such as a carbo-metallic oil, follows. Referring to FIG. 3, which is a simplified schematic diagram of such a system, the heavy hydrocarbon stream is charged via conduits 26, 26', and 27 to riser reaction zone 28, where it contacts a suspension of inert solid particulate material in a fluidizing gas. The solid particulate material enters riser reaction zone 28 from standpipe 29 and the fluidizing gas from line 30. The suspension formed and passed through riser 28 is discharged from the open upper end of the riser reaction zone 28 into disengaging zone 31, where it is separated rapidly into vaporous hydrocarbons and the coked solid particulate material. The hydrocarbon vapors are removed by line 32 and quenched to form a product comprising a mixture of vaporous and liquid product, which is sent subsequently to a product recovery section (not shown). The solid particulate material, a sorbent material, such as a kaolin-type sorbent material or other suitable solid sorbent particulate material, comprising accumulated metal deposits and carbonaceous material, is collected in a bottom portion of disengaging zone 31 for passage downwardly through a stripping zone 33 to which a stripping gas, such as steam, is charged by line 34 at a temperature of at least about 204° C. (400° F.). Stripped solid particulate material is passed via standpipe 35 to a relatively dense fluid bed 36 of solid particulate material in a bottom portion of regeneration zone 37. Regeneration gas or a combustion-supporting gas, such as an oxygen-containing gas or air, is charged to a bottom portion of the fluid bed 36 in regeneration zone 37 by line 38 and gas distribution means 39. Regeneration of the sorbent particulate material is accomplished by combustion of deposited carbonaceous material at a temperature within the range of about 704° C. (1,300° F.) to about 760° C. (1,400° F.) or 816° C. (1,500° F.), preferably with an oxygen-containing gas promotion the formation of a carbon monoxide (CO) or carbon dioxide ($CO_2$) rich regeneration flue gas as desired. Combustion product gases carry suspended sorbent particles overhead from an upper level of the more dense fluid bed 36 in the bottom of the regeneration zone 37 upwardly through a restricted or confined elongated passageway 40 at its upper end. The solid particulate material passes up through the elongated transport zone 40 as a suspended mass of the solid particulate in hot combustion product flue gases for discharge into an upper enlarged solids disengaging zone 41. The solid particulate material is separated from the product flue gases in disengaging zone 41. The separated hot solid particulate material is collected as an annular fluid bed 42 of material recovered at an elevated temperature in an annular zone between the restricted elongated passageway 40 and lower portion of disengaging zone 41. Flue gases separated from the solid particulate material pass through appropriate cyclones and auxiliary equipment (not shown) for withdrawal from disengaging zone 41 via line 43 and for further treatment by equipment not shown.

Regenerated solid particulate sorbent material collected as the fluid bed 42 is transferred via standpipe 29 to the bottom of riser reaction zone 28 for upflow therein as described hereinabove. Such regenerated solid sorbent particulate material is at a temperature within the range of about 538° C. (1,000° F.) to about 816° C. (1,500° F.).

A portion of the hot regenerated sorbent particulate material is passed downwardly and directly into the top of cylindrical heat exchanger zone 44, which provides partial cooling of the hot particulate material. Boiler feed water is charged to a bottom plenum chamber via line 45 and is converted to a water-steam mixture by indirect heat exchange with the downflowing hot fluid solid particulate material. The water-steam mixture is withdrawn from heat exchanger zone 44 via line 46. this water-steam mixture is at a temperature of about 232° C. (450° F.) or higher. The solid sorbent particulate material is reduced in temperature from about 50 degrees up to about 200 degrees, and more usually about 100 degrees, or as required for regeneration temperature control. The partially cooled solid particulate material is withdrawn by line 47 for passage to the relatively dense but upflowing fluid bed 36 in regeneration zone 37.

The heat exchanger zone or cooling vessel 44, provided with bayonet-type conduit combinations and vertical aeration conduits, is the same as the cooling vessel depicted in FIG. 1 and described hereinabove. Fluidizing or fluffing gas, such as air or nitrogen, is passed into and through header means and vertical aeration conduits 44'.

A second example of the use of the heat exchanger or cooling vessel of the present invention is presented in accompanying FIG. 4, which shows a reaction-regeneration system for the RCC process, which converts the demetallized and decarbonized product recovered from the reactor-regenerator system described hereinabove and presented in FIG. 3. The RCC process system comprises two sequential stages of catalyst regeneration one above the other in combination with a riser cracking operation. The catalyst employed in this process is a catalyst containing a crystalline molecular sieve.

Figure 4:
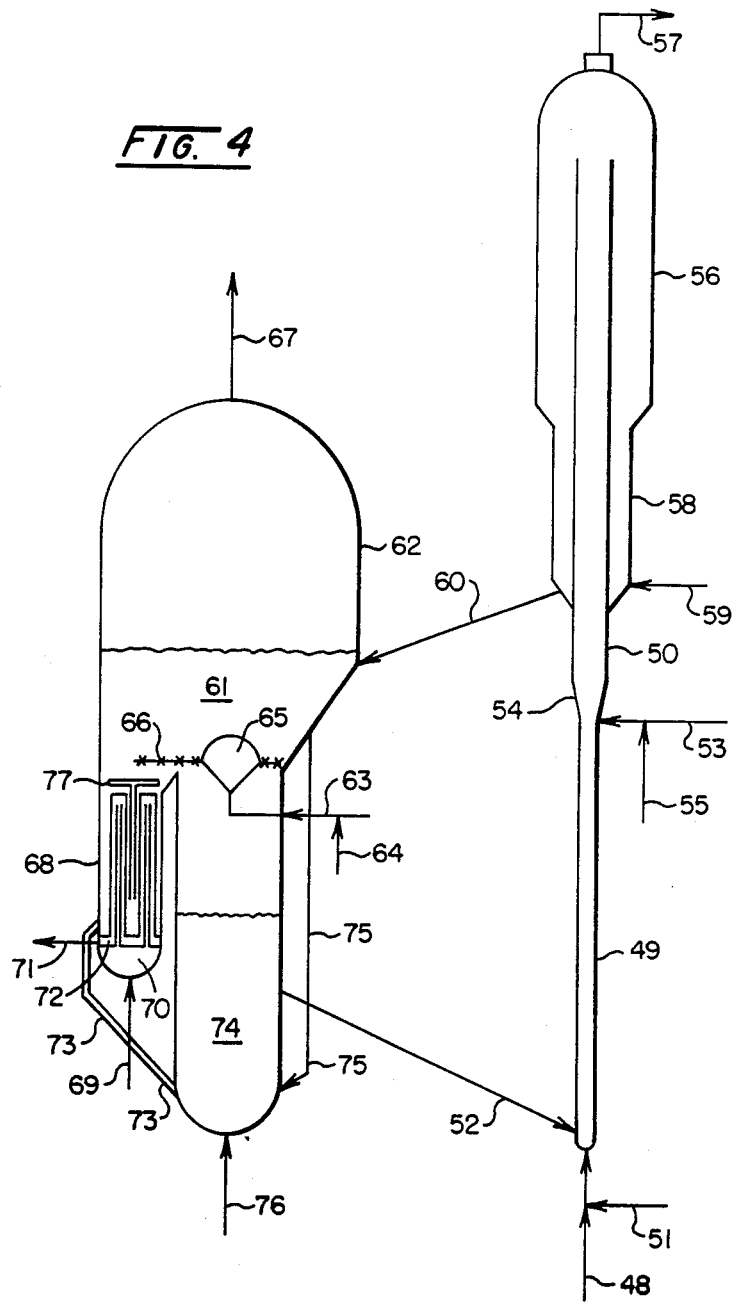
FIG. 4 is a simplified diagram in elevation of the apparatus for the catalyst cracking and catalyst regeneration system of the RCC process, which system employs the improved cooling vessel of the present invention.

Referring now to FIG. 4, a lift gas is charged by line 48 to the bottom of a riser reactor zone, which is made up of a lower section 49 and an upper section 50. The diameter of the lower section 49 is smaller than that of upper section 50. The lift gas is charged with or without thermally produced naphtha that is added by line 51 for admixture with hot regenerated catalyst particles charged thereto by standpipe 52. An upflowing suspension of solid particulate material at an elevated temperature within the range of about 677° C. (1,250° F.) to about 760° C. (1,400° F.) is formed. The suspension passes upwardly through the lower section 49 of the riser reaction zone into and through the upper section 50 of the riser reaction zone. The hydrocarbon feed product of thermal visbreaking from the demetallization and decarbonization treatment described hereinabove is charged in one specific arrangement by conduit 53 to the expanding transition section 54 of the riser reactor zone. The oil feed and diluent material, charged by line 55, is prayed into the upflowing suspension of catalyst particles and lift gas to provide a desired elevated catalytic conversion temperature. The suspension is discharged from the top of the upper section 50 of the riser reaction zone, whereupon the gaseous and vaporous product material is separated from the solid particulate material in disengaging zone 56 by any one of the techniques known and described in the prior art.

Vaporous product material and stripping gas are recovered from the top portion of the disengaging zone 56 by way of line 57 for passage to a product fractionation zone (not shown).

The discharged catalyst particles that are separated from the gaseous and vaporous material in the disengaging zone 56 pass downwardly through the annular stripping zone 58. Stripping steam is introduced into stripping zone 58 via line 58. The stripped catalyst particles are recovered from the bottom of stripping zone 58 and passed by conduit 60 to a first fluid bed 61 of solid fluid catalyst particles being regenerated in a first stage of catalyst regeneration in vessel 62. The catalyst comprising hydrocarbonaceous deposits of catalyst conversion and metal deposits is partially regenerated in an oxygen-limited atmosphere providing a CO-rich flue gas product comprising $CO_2$ and sulfur oxides under regeneration temperature conditions constrained not to exceed about 650° C. (1,400° F.). A suitable oxygen-containing regeneration gas is introduced by conduit 63, along with liquid water or steam by line 64, to a plenum distributor chamber 65 communicating with gas distributing means 66. Hence, the regeneration gas is charged to a bottom cross-section portion of bed 61. Regeneration is regeneration vessel 61 is accomplished under limited temperature conditions to remove substantial hydrocarbonaceous deposits up to about 75% or more thereof on the solid particulate material. The flue gases are withdrawn from vessel 62 via conduit 67.

The partially-regenerated catalyst in bed 61 is passed downwardly and directly into the upper open end of cylindrical cooling vessel 68 to which boiler feed water is charged by conduit 69 to a lower header distributor chamber 70 and a hot water-steam mixture is recovered by conduit 71 from an adjacent upper header chamber 72. The indirect cooling of the partially-regenerated catalyst as it passes downwardly through the heat exchanger 68 is accomplished by an amount in the range of to about 200 degrees.

The cooled partially-regenerated catalyst particles are recovered from a lower portion of cooler 68 for passage by conduit 73 to a relatively dense fluid bed of catalyst 74 being regenerated in a second stage of catalyst regeneration in regeneration vessel 62. The partially-cooled catalyst particles can be passed up an upper or lower portion of bed 74. If desired, some of the catalyst particles in bed 61 can be passed directly from bed 61 to bed 74 via conduit 75. Preferably, substantially all of the transferred catalyst should pass through cooler 68 for temperature control purposes in an amount that is sufficient to sustain a restricted regeneration temperature not to exceed about 816° C. (1,500° F.).

An oxygen-rich combustion-supporting regeneration gas is charged by conduit 76 to a bottom portion of vessel 62. The catalyst in bed 74 is regenerated by combusting residual carbonaceous material remaining on the catalyst following the first stage of regeneration under temperature conditions restricted within the range of 732° C. (1,350° F.) to about 816° C. (1,500° F.). The regeneration temperature of the catalyst in bed 74 is restricted preferably not to exceed substantially about 760° C. (1,400° F.) during combustion in the presence of an oxygen-rich combustion gas producing $CO_2$-rich flue gases comprising some unconsumed oxygen. The carbon level on the regenerated catalyst is preferably less than 0.25 wt. %. The regenerated catalyst is withdrawn from fluid bed 74 and passed by standpipe 52 to the lower section 49 of the riser reactor zone.

The cooler 68 is the same as the cooler described hereinabove and depicted in FIG. 1, i.e., the cooling vessel of the present invention, and has the vertical aeration conduits 77 for introducing fluidizing gas into the cooling vessel 68.

Accordingly, there is also provided in an improved solid particulate material regeneration system comprising two separate collected fluidized masses of said solid particulate material with one mass of solid particulate material above the other, the improvement which comprises: (a) regenerating the solid particulate material by combustion of deposited hydrocarbonaceous material on said solid particulate material in two separate stages arranged for sequential flow of solid particulate material therethrough under regeneration temperature conditions maintained less than 816° C. (1,500° F.); (b) accomplishing said regenerating of solid particulate material in the first stage of regeneration under conditions providing a CO-rich flue gas recovered therefrom at an elevated temperature up to about 760° C. (1,400° F.); (c) recovering a $CO_2$-rich flue gas comprising combustion-supporting amounts of oxygen from the second stage of regeneration; (d) passing the $CO_2$-rich flue gas upwardly through the bed of solid particulate material in said first-stage of regeneration; (e) cooling soild particulate material flowing downwardly counter-current to fluidizing gas in a heat-exchange zone external to said two regeneration stages to provide partially-cooled solid particulate material, said heat-exchange zone being provided with a plurality of upwardly extending bayonet-type liquid-carrying heat-exchange conduit combinations and a means for charging said fluidizing gas to a lower cross-sectional portion and an intermediate cross-sectional portion of said heat-exchange zone, said means comprising a header means located near the upper end of said heat-exchange zone and having suspended from said header means a plurality of vertical aeration conduits, a first portion of said vertical aeration conduits having their lower ends located in said lower cross-sectional portion of said heat-exchange zone and a second portion of said vertical aeration conduits having their lower ends located in said intermediate cross-sectional portion of said heat-exchange zone, each of said vertical aeration conduits having a restriction orifice in that vertical aeration conduit near the lower end of that vertical conduit; (f) passing said partially-cooled solid particulate material following downward traverse of said heat-exchange zone to said second stage of regeneration; and (g) passing said fluidizing gas upwardly through said heat-exchange zone and said first stage of regeneration for recovery with combustion flue gases.

Specific compositions, methods, or embodiments discussed are intended to be only illustrative of the invention disclosed by this Specification. Variation on these compositions, methods, or embodiments are readily apparent to a person of skill in the art based upon the teachings of this Specification and are therefore intended to be included as part of the inventions disclosed herein.

Reference to patents made in the specification is intended to result in such patents being expressly incorporated herein by reference including any patents or other literature references cited within such patents.

What is claimed is:

1. An arrangement of apparatus for transferring heat between solid particulate material of fluidizable particle size and a heat exchange fluid, which arrangement of apparatus comprises in combination:
    A. a vertical cylindrical chamber having at its upper end an inlet for charging heated solid particulate material thereto;
    B. a bottom portion of said cylindrical chamber, said bottom portion being separated into an upper header chamber and a lower header chamber;
    C. a plurality of open-ended first conduits in parallel arrangement extending upwardly from said lower header chamber to an upper part of said cylindrical chamber and being parallel to the axis of said cylindrical chamber;
    D. a plurality of second conduits having larger diameters than said open-ended first conduits, each of said second conduits being parallel to and encasing one of said open-ended first conduits to form a conduit combination therewith and to provide an annular space between the two concentric conduits of said conduit combination, the plurality of said open-ended first conduits and the plurality of said second conduits providing a plurality of conduit combinations, each of said second conduits being in open communication at the bottom annular end thereof with said upper header chamber;

E. a means for charging a heat exchange fluid to said lower header chamber and a means for withdrawing heated heat exchange fluid from said upper header chamber;

F. a means for charging fluidizing gaseous material to a lower cross-sectional portion and an intermediate cross-sectional portion of said cylindrical chamber, said means for charging fluidizing gaseous material comprising a header means located within said cylindrical chamber and near the upper end of said cylindrical chamber and having suspended from said header means a plurality of vertical aeration conduits, a first portion of said vertical aeration conduits having their lower ends located in said lower half of said cylindrical chamber and a second portion of said vertical aeration conduits having their lower ends located in said upper half of said cylindrical chamber, each of said vertical aeration conduits having a restriction orifice near its lower end, said restriction orifice reducing the velocity of fluidizing gaseous material passing through that aeration conduit; and G. an opening means in the side of said cylindrical chamber above said upper header chamber for withdrawing solid paticulate material that is passed downwardly through said cylindrical chamber in indirect heat exchange with said heat exchange fluid.

2. The apparatus of claim 1, wherein said conduits combinations are positioned horizontally spaced apart up to about two inches to facilitate downward flow of solid particulate material therebetween.

3. The apparatus of claim 1, wherein the first conduit and second conduit combination are coaxially aligned with each other by short vertical fin means.

4. The apparatus of claim 1, wherein the first conduit of each conduit combination is attached to a horizontal plate forming a separation baffle between said lower header chamber and said upper header chamber.

5. The apparatus of claim 1, wherein the number of vertical aeration conduits in said first portion of vertical aeration conduits and the number of vertical aeration conduits in said second portion of vertical aeration conduits are sufficient to provide adequate and proper fluidization of said solid particulate material as said solid particulate material passes downwardly through said vertical cylindrical chamber.

6. The apparatus of claim 1, wherein the restriction orifice of each of said vertical aeration conduits provides a pressure drop within the range of about 1 psi to about 10 psi.

7. The apparatus of claim 1, wherein the number of vertical aeration conduits in said first portion of vertical aeration conduits is equal to the number of vertical aeration conduits in said second portion of vertical aeration conduits.

8. The apparatus of claim 2, wherein the first conduit and second conduit of each conduit combination are coaxially aligned with each other by short vertical fin means.

9. The apparatus of claim 2, wherein the number of vertical aeration conduits in said first portion of vertical aeration conduits and the number of vertical aeration conduits in said second portion of vertical aeration conduits are sufficient to provide adequate and proper fluidization of said solid particulate material as said solid particulate material passes downwardly through said vertical cylindrical chamber.

10. The apparatus of claim 2, wherein the restriction orifice of each of said vertical aeration conduits provides a pressure drop in the range of about 1 psi to about 10 psi.

11. The apparatus of claim 8, wherein the number of vertical aeration conduits in said first portion of vertical aeration conduits and the number of vertical aeration conduits in said second portion of vertical aeration conduits are sufficient to provide adequate and proper fluidization of said solid particulate material as said solid particulate material passes downwardly through said vertical cylindrical chamber.

12. The apparatus of claim 8, wherein the first conduit of each conduit combination is attached to a horizontal plate forming a separation baffle between said lower header chamber and said upper header chamber.

13. The apparatus of claim 11, wherein the restriction orifice of each of said vertical aeration conduits provides a pressure drop within the range of about 1 psi to about 10 psi.

14. The apparatus of claim 12, wherein the number of vertical conduits in said first portion of vertical aeration conduits and the number of vertical aeration conduits in said second portion of vertical aeration conduits are sufficient to provide adequate and proper fluidization of said solid particulate material as said solid particulate material passes downwardly through said vertical cylindrical chamber.

15. The apparatus of claim 14, wherein the restriction orifice of each of said vertical aeration conduits provides a pressure drop within the range of about 1 psi to about 10 psi.

16. The apparatus of claim 15, wherein the number of vertical aeration conduits in said first portion of vertical aeration conduits is equal to the number of vertical aeration conduits in said second portion of vertical aeration conduits.

17. In an improved apparatus for transferring heat between solid particulate material of fluidizable particle size and a heat exchange fluid, which apparatus comprises in combination A. a vertical cylindrical vessel having an inlet at its upper end for charging heated solid particulate material to said cylindrical vessel, a bottom portion of said cylindrical vessel, said bottom portion being separated into upper and lower header chambers, a plurality of open-ended first conduits in parallel arrangement extending upwardly from said lower header chamber to an upper part of said cylindrical vessel, a plurality of second conduits having larger diameters than said open-ended first conduits, each of said second conduits having a diameter that is larger than the outside diameter of said first conduits and being concentric with and encasing one of said open-ended first conduits to form a conduit combination providing an annular space between the two concentric conduits of said conduit combination, each of said second conduits being in open communication at the bottom annular end thereof with said upper header chamber, a means for charging a heat exchange fluid to said lower header chamber and a means for withdrawing heated heat exchange fluid from said upper header chamber, a means for charging fluidizing gaseous material to a cross-sectional portion of said cylindrical vessel, and an opening means in the side of said cylindrical vessel above said upper header chamber for withdrawing cooled solid particulate material that has passed downwardly through said cylindrical vessel in indirect heat exchange with said heat exchange fluid passing through said annular space provided by the conduit combinations, THE IMPROVEMENT WHICH COMPRISES including in said means for charging fluidizing gaseous material a header means located within said cylindrical vessel and near the upper end of said cylindrical vessel and having suspended from said header means a plurality of vertical aeration conduits, a first portion of said vertical aeration conduits having their lower ends located in the lower half of said cylindrical vessel and a second portion of said vertical aeration conduits having their lower ends located in the upper half of said cylindrical vessel, each of said vertical aeration conduits having a restriction orifice in that vertical aeration conduit near the lower end of that vertical aeration conduit.

18. The apparatus of claim 17, wherein the number of vertical aeration conduits in said first portion of vertical aeration conduits and the number of vertical aeration conduits in said second portion of vertical aeration conduits are sufficient to provide adequate and proper fluidization of said solid particulate material as said solid particulate material passes downwardly through said vertical cylindrical vessel.

19. The apparatus of claim 17, wherein the restriction orifice of each of said vertical aeration conduits provides a pressure drop within the range of about 1 psi to about 10 psi.

20. The apparatus of claim 17, wherein the number of vertical aeration conduits in said first portion of vertical aeration conduits is equal to the number of vertical aeration conduits in said second portion of vertical aeration conduits.

21. The apparatus of claim 17, wherein said lower cross-sectional portion of said cylindrical vessel is at a distance from the top of said cylindrical vessel that is within the range of about 85% to about 95% of the total distance from the top to the bottom of said cylindrical vessel and said intermediate cross-sectional portion of said cyindrical vessel is at a distance from the top of said cylindrical vessel that is within the range of about 50% to about 70% of the distance from the top to the bottom of said cylindrical vessel.

22. An arrangement of apparatus for transferring heat between solid particulate material of fluidizable particle size and a heat exchange fluid, which arrangement of apparatus comprises in combination:
  A. a substantially vertical cylindrical chamber having an inlet for charging heated solid particulate material thereto and an outlet for withdrawing cooled solid particulates therefrom and having a portion of said cylindrical chamber separated into a first header chamber and a second header chamber;
  B. a plurality of open-ended first conduits in parallel arrangement extending from said second header chamber into said cylindrical chamber and being substantially parallel to the axis of said cylindrical chamber;
  C. a plurality of second conduits having larger diameters than said open-ended first conduits, each of said second conduits being substantially parallel to and encasing one of said open-ended first conduits to form a conduit combination therewith and to provide an annular space between the two substantially concentric conduits of said conduit combination, each of said second conduits being in open communication at an annular end thereof with said first header chamber;
  D. a means for charging a heat exchange fluid to said second header chamber and a means for withdrawing heated heat exchange fluid from said first header chamber;
  E. a means for charging fluidizing gaseous material to said cylindrical chamber, said means for charging fluidizing gaseous material comprising a header means located within said cylindrical chamber and having substantially vertically suspended therefrom a plurality of aeration conduits substantially parallel to the axis of said cylindrical chamber, each of at least some of said aeration conduits having a restriction orifice near the end of that particular aeration conduit, said restriction orifice being located in said particular aeration conduit to reduce the velocity of said fluidizing gaseous material passing through said particular aeration conduit.

23. The apparatus of claim 22, wherein at least some of said aeration conduits are positioned by means of spacer rings.

24. The apparatus of claim 22, wherein the first conduit of each conduit combination is attached to a horizontal plate forming a separation baffle between said first header chamber and said second header chamber.

25. The apparatus of claim 22, wherein the number of aeration conduits are sufficient to provide adequate and proper fluidization of said solid particulate material as said solid particulate material passes through said vertical cylindrical chamber.

* * * * *